United States Patent Office 3,783,115
Patented Jan. 1, 1974

3,783,115
PROCESS FOR THE RADIATION TREATMENT
OF POLYETHYLENE
Gisela Zeppenfeld, Dresden, Germany, assignor to
Ve Textilkombinat Cottbus, Cottbus, Germany
No Drawing. Filed July 23, 1971, Ser. No. 165,738
Int. Cl. B01j 1/10, 1/12
U.S. Cl. 204—159.2                    4 Claims

ABSTRACT OF THE DISCLOSURE

Process for preparing cross-linked polyethylene fiber materials by means of high energy radiation comprising irradiating a polyethylene sheet material with a high dose rate, preferably $\geq 10^4$ rad/s. under an inert gas cushion or in vacuum, with a radiation dose of between 5 and 20 mrad, preferably between 6 and 10 mrad and thereafter tempering the irradiated sheet material in a heating zone under an inert gas cushion or in vacuum at a temperature under the crystallite melting point and preferably at a temperature of between 80 and 120° C.

---

This invention relates to a process of manufacturing textile sheet materials from cross-linked and thermally stable polyethylene fibers and preferably from polyethylene split fibers.

It is known to cross-link polyethylene fiber materials by irradiation with high energy rays and thereby to increase the material's thermal and solvent stability. Until now the irradiation was carried out in air or under an inert gas. It was thereby established that under these conditions a high degree of cross-linking could be obtained. The disadvantage, however, of this process is that in contrast to the cross-linking of solid materials, such as for instance plates and tubes, the resultant effect on the fiber materials is that the thermal and solvent stabilities of the textile materials are low and additionally there is a marked decrease in the resistance thereof to aging.

It is an object of the instant invention to provide a method for increasing the thermal and solvent stabilities of polyethylene fiber materials and simultaneously to preserve the strength and aging properties of the starting materials.

Another object of the invention is to provide polyethylene fiber sheet materials characterized by excellent thermal and solvent stabilities as well as by improved strength and aging characteristics.

Still another object of this invention is to provide a process for obtaining such products through cross-linking by means of high energy radiation.

These and other objects and advantages of the invention will be apparent from a consideration of the following disclosure.

In accordance with the invention it has now been found that polyethylene fiber materials radiated with high dose rate $\geq 10^4$ rad/s.) using irradiation doses of between 5 and 20 mrad preferably between 6 and 10 mrad under an inert gas cushion, such as for instance, nitrogen, carbon dioxide or argon and then aftertreated in a heated zone under an inert gas (oxygen concentration $\leq 10^{-4}$ g./l.) at a temperature under the crystallite melting point and preferably between 80 and 120° C. have the desired thermal and solvent stabilities and also improved strength and aging characteristics.

Fiber materials which have been crossed-linked at room temperature have the same strength characteristics as untreated materials. By treating the materials at high temperatures the strength characteristics are essentially improved as compared to the untreated materials. The cross-linked materials show in comparison to the untreated materials in the proximity of their melting points practically no shrinkage and no tendency to flow or melt under loading.

At the melting point of these materials and with the materials in the unloaded state, a marked reverse shrinkage sets in which contrary to the untreated material does not result in a melting of a fiber. The shrunk fiber remains however up until a temperature of 200° C. stable. By the use of suitable devices the shrinkage can be prevented. The swelling of the treated material (in organic solvents) is considerably lower than that of the untreated materials. Shrinkage occurs to a markedly lower degree and the materials are stable up to very high temperatures. The stability against aging of these materials, particularly to oxygen, for example as determined in the presence of ultra violet light (open air weathering) is the same as in the starting material.

All of the above-mentioned effects are achieved in a marked degree even after irradiation with relatively low total doses which doses have heretofore been considered as less than required to produce optimal cross-linking.

All of the above-produced effects except for the reduced shrinkage and the elimination of flowing under loading are realized on obtaining the optimal degree of cross-linking the shrinkage occurring only in reduced measure or not at all.

The desired aforenamed effects are not realized, however, if the material is only irradiated and not aftertreated.

Instead of carrying out the aftertreatment or tempering under an inert gas, the corresponding irradiated material can be aftertreated with a monomer gas or vapor. Thereby the fiber material can have imparted thereto depending on the type of monomer used additional improved properties. If the crossed-linked material is aftertreated with an acrylate, the same demonstrates for an example an increased ability of taking up dispersion dyes and has a softer hand or feel as well as excellent thermal resistance and resistance to aging. A material treated with acrylic acid demonstrates additionally a lower tendency to electrostatic charge and furthermore, its surface is rendered more readily printable.

The use of a monomer gas or vapor is not required to be carried out under the temperature limits required for the general tempering treatment.

By using the aforenamed monomers the additional desired effects are realized even when the aftertreatment is carried out at room temperature.

In accordance with another aspect of the invention, it has been found that if the polymers are irradiated under hot water or steam or aftertreated with hot water or steam materials having the desired properties are obtained. Most advantageously the treatment with the hot water or steam is carried out in the presence also of the monomer.

By using hot water or steam instead of the inert gas or the vacuum it is not necessary to use temperatures approaching the crystallite melting point of the polyethylene. Thus in carrying out the aftertreatment using hot water or steam instead of the inert gas, the material need not be heated to the crystallite melting point of the polyethylene. Preferably, however, there are used temperatures of between 80 to 100° C. It is also possible in accordance with the invention to combine the irradiation with the aftertreatment so that the irradiation is carried out under steam or in the presence of hot water and the textile-like sheet thereafter conveyed for a short time through a vapor saturated atmosphere. It is favorable if the steam is passed in counter-current from the point of exit of the crossed-linked material. The textile-like sheet can be preheated prior to the irradiation.

It is also possible to combine the steam with a monomer of the type above mentioned and to treat the textile-like sheet with the mixture in order to impart additionally favorable properties. By this variant of the process of the invention, the same desirable properties are obtained as previously mentioned. The advantages of this embodiment as compared to the already mentioned variants carried out with nitrogen or under vacuum lies in that the treatment with steam or hot water is cheaper and also that the cross-linking process is essentially simpler to operate.

The invention will be further illustrated by the following examples. The invention, however, is not be construed as limited in any way thereby.

EXAMPLE 1

Split fiber web prepared from low pressure polyethylene (denier 100 tex.) was irradiated with an electron accelerating apparatus in a vessel or container filled with nitrogen using a high dose rate of $8 \times 10^4$ rad/s. For a total dose of 10 mrad and thereafter tempered at 80° C. The thusly treated web had the same strength characteristics as when treated at room temperature and the same aging properties but a doubled resistance to tearing at 100° C. This web does not evidence any tendency to flowing. The shrinkage amounts to about 1–2% in boiling water, boiling trichloroethylene and at 100° C. in air in comparison to 10% for the untreated web.

EXAMPLE 2

A split fiber web prepared from low pressure polyethylene (denier 100 tex.) was irradiated under the same conditions as set out in Example 1 and thereafter treated at room temperature with ethyl acrylate at a saturated pressure of the monomer until an increase in weight of 10% had been effected. The thusly treated web demonstrated the same properties as the material in Example 1 and additionally evidenced an excellent dyeability with dispersion dyestuffs.

EXAMPLE 3

A web on the basis of low pressure polyethylene (100 tex.) was preheated to 80° C. and then introduced into a irradiation chamber into which steam having a temperature of 110° C. was also charged. The web passed through the irradiation zone and thereafter was subjected to a short afterstretching. This material which had been irradiated under steam and with 10 mrad and aftertreated with steam for 5 minutes showed the same properties as the material described in Example 1.

EXAMPLE 4

A nonwoven fabric produced on the base of low-pressure polyethylene is preheated to 80° C. and introduced into an irradiation chamber charged by a mixture of steam and 20% acrylic acid having a temperature of about 110° C. The nonwoven fabric is irradiated to a dose of 10 mrad and then aftertreated with the mixture for 15 minutes. This product has same properties as the product of Example 1 and, moreover, it can be printed.

After a short treatment with a 0.1% aqueous salt solution (for instance sodium-salt solution) the product has excellent electrostatic properties, e.g. a surface conductivity of about $10^{-2}$ G$\Omega$ at a relative humidity of 64%. The nontreated basic material shows, in comparison with it, a value of >25,000 G$\Omega$ and cannot be printed.

The resultant products are showing the following actual physical characteristics: at 20° C. breaking length about 30 km., elongation at break 25%; at 100° C. breaking length about 10–15 km., elongation at break 50%; at 160° C. breaking length about 1.5 km., elongation at break 30%; and temperature at break about 200° C.

What is claimed is:

1. A process for the treatment of a web consisting essentially of low-pressure polyethylene filaments to increase its thermal stability and resistance to aging and solvents while preserving its tensile strength which comprises preheating the said web to a temperature between approximately 80 and 100° C. and thereafter subjecting the said web to an aftertreatment with high-energy electrons in an irradiation chamber at a dosage rate of at least $1 \times 10^4$ rads per second and for a period sufficient for the web to absorb a total dose between 5 and 20 mrads of radiation while exposed to hot water or an atmosphere of steam.

2. Process of claim 1 wherein said doses of radiation amount to between 6 and 10 mrad.

3. A process as defined in claim 1 in which the web that is treated is a non-woven web of low pressure polyethylene fibers which is irradiated with a total dose of approximately 10 mrads.

4. A process as defined in claim 1 in which the web is exposed to steam at a temperature of approximately 110° C. during the irradiation.

References Cited

UNITED STATES PATENTS

| | | | |
|---|---|---|---|
| 3,362,897 | 1/1968 | Lawton | 204—159.2 |
| 3,388,051 | 6/1968 | Rainer et al. | 204—159.17 |
| 3,107,206 | 10/1963 | Cottet et al. | 204—159.15 |
| 3,576,933 | 4/1971 | Bates et al. | 260—94.9 GA |
| 3,567,697 | 3/1971 | Bates et al. | 260—94.9 GA |

MURRAY TILLMAN, Primary Examiner

R. B. TURER, Assistant Examiner

U.S. Cl. X.R.

8—115.5; 204—159.17; 260—878